UNITED STATES PATENT OFFICE.

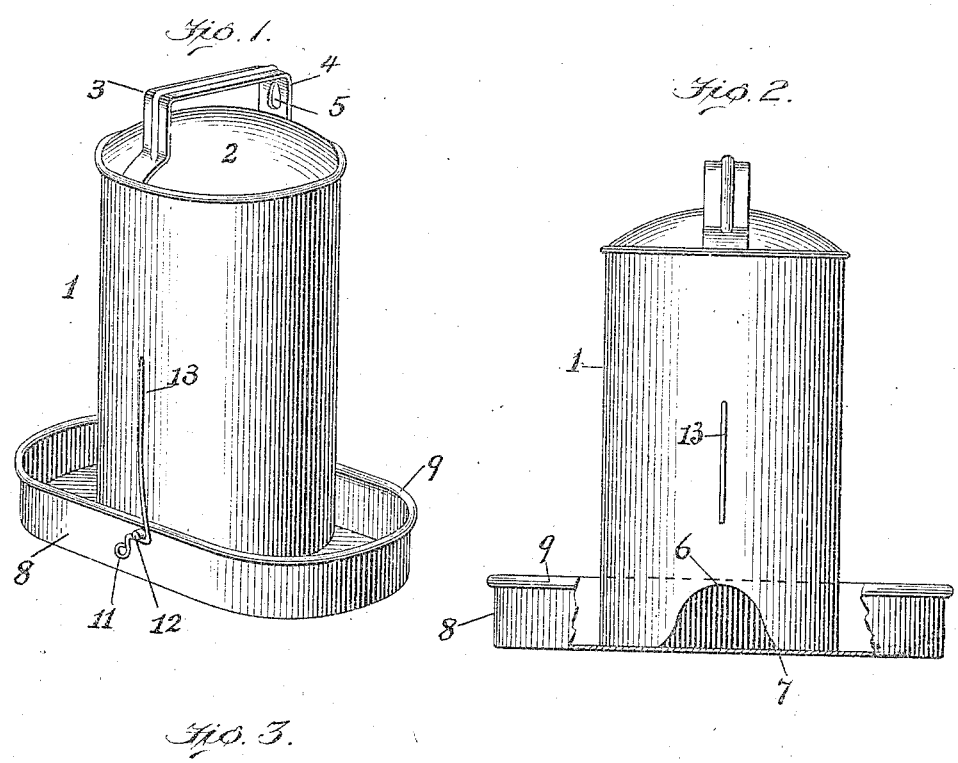
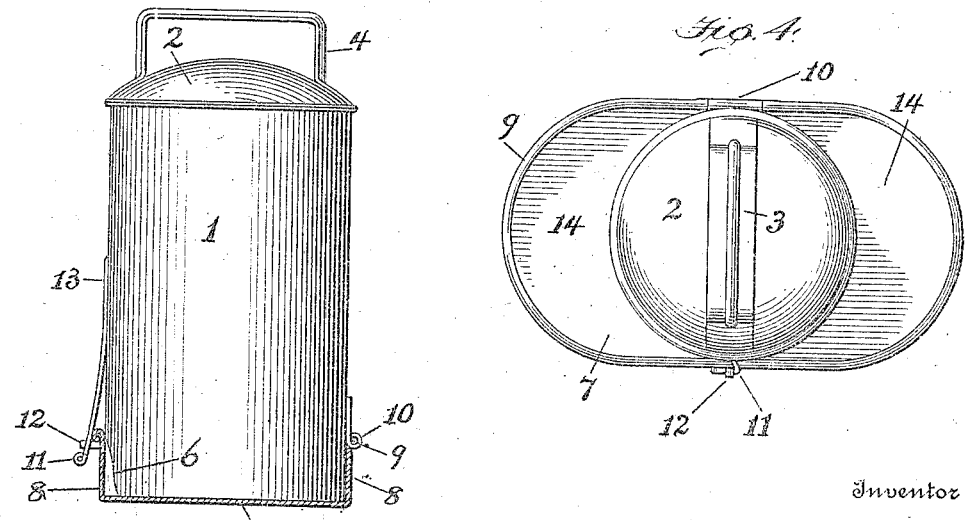

WILMER FRANKLIN KENLY, OF GLEN ROCK, PENNSYLVANIA, ASSIGNOR TO THE GLEN ROCK STAMPING COMPANY, OF GLEN ROCK, PENNSYLVANIA, A CORPORATION OF PENNSYLVANIA.

FOUNTAIN FOR FOWLS.

1,093,235.        Specification of Letters Patent.        Patented Apr. 14, 1914.

Application filed May 3, 1912. Serial No. 694,998.

*To all whom it may concern:*

Be it known that I, WILMER FRANKLIN KENLY, a citizen of the United States, residing at Glen Rock, in the county of York and State of Pennsylvania, have invented certain new and useful Improvements in Fountains for Fowls, of which the following is a specification.

This invention relates to a watering fountain for fowls.

The object of the invention is to provide an improved reservoir to contain a storage of clean water and a drinking pan accessible to fowls, all operated on the well-known barometric principle.

The invention is illustrated in the accompanying drawing, in which,

Figure 1 is a perspective view of the complete reservoir and drinking pan. Fig. 2 is a front elevation of the same in which the wall of the pan is shown with its central part broken away. Fig. 3 shows a side elevation of the reservoir and a cross-section of the pan. Fig. 4 is a top view of the complete reservoir and pan.

The water reservoir, 1, may be made of metal and has the form of a vertical cylinder whose upper end is closed by a rounded or dome-shaped top, 2; a loop-shaped handle, 3, is secured on the top and one of the vertical ends, 4, of the handle is provided with a hole, 5, that may engage the end of a pin or nail projecting laterally from an upright wall or a post. The lower end of the reservoir cylinder, 1, is open or bottomless, but with this exception said reservoir is constructed to be air-tight. The lower front edge of the reservoir has a cut-out part, 6, see Figs. 2 and 3, which serves purposes that will be presently explained. The drinking-pan has a flat bottom, 7, and an upright wall or flange, 8, extending all around; the top of the wall has a rounded edge, 9. The particular shape of the outline of the pan is that of an oval.

The diameter of the cylindric reservoir and the internal width of the drinking pan across its shortest dimension are such as to permit the reservoir to snugly fit between opposite side walls, 8, and stand within the pan. At the back of the reservoir a hinge, 10, couples or unites the reservoir directly to the top of the pan-wall. The rounded top edge, 9, of the pan constitutes the pintle or pivot of the hinge. This hinged construction of the two parts enables one part to be tilted relative to the other.

By reference to Fig. 3, it will be seen that the cut-out parts, 6, at the lower front of the cylindric reservoir is diametrically opposite the hinge, 10, at the back, and the removal of the metal of said cut-out part from the lower edge of the reservoir permits the top edge, 9, of the wall, 8, of the pan to be cleared when the reservoir tilts; this is one purpose of the cut-out. In Fig. 2 it will be seen that the rim or top edge, 9, of the pan is a little higher than the highest part of said cut-out part, 6, and thereby the pneumatic action is such that the drinking pan will always stand full of water, for the reason the moment the water in the pan is lowered below the highest part of the cut-out, 6, air will enter the reservoir and therefore water will flow from the reservoir to the pan and the level of the water in the latter will be raised enough to seal the cut-out, 6. This action is the second purpose of said cut-out.

The front wall of the pan contacts with the wall of the reservoir and the pan has a suitable means for the engagement of a spring catch or latch, 11, attached to the front of the reservoir; this engaging means on the exterior wall of the pan may be a stud or pin, 12, projecting laterally. In the present instance the spring catch at its secured end, 13, has the form of a straight wire and this end is made fast to the reservoir by means of solder; the other end, 11, of this wire is free and takes on the exterior of the pan-wall and serves as a catch to engage the pan.

The structure described form a drinking space, 14, in the pan either at one side or two opposite sides of the reservoir, according to the length of the greatest dimension of the oval pan; the fowls drink at this space. In some cases there may be only one drinking space, 14, and in others there may be two such spaces.

The fountain is filled as follows: The spring catch, 11, is disconnected, and the reservoir and pan are reversed or turned upside down; then the drinking pan is tilted on the hinge, 10, to uncover the lower end of the reservoir; water is then filled into the reservoir, the pan is turned back to cover the lower end of the reservoir, and the retaining catch is engaged with the pin, 12, and finally the reservoir and pan are turned to their normal position, as shown in Fig. 1. The fountain may then be placed in any position wherever desired, to readily give the fowls access to the spaces, 14, of the drinking pan.

Having thus described my invention what I claim and desire to secure by Letters Patent is:—

In a water fountain the combination with a drinking pan longer in one direction than the other and provided with an upright wall all around the same, of a cylindric water reservoir having an open lower end which seats on the pan and the diametrically opposite portions of which are in close proximity to the two opposite sides of the upright pan wall across the narrow portion of the pan,—said water reservoir having a hinge which pivotally connects the reservoir with the pan wall at the narrow portion and diametrically opposite said hinge the lower edge of the reservoir being provided with a cut-away portion whereby to allow the said reservoir wall to clear the pan wall to allow it to be turned back on the hinge, and a catch device having one part on the pan wall adjacent to said reservoir cut-out and a coacting catch part on the reservoir wall.

In testimony whereof I affix my signature in presence of two witnesses.

WILMER FRANKLIN KENLY.

Witnesses:
L. C. GROVE,
HENRY WEBER.